June 10, 1924.

J. H. SISSON

LAWN MOWER RACK

Filed Sept. 12, 1922

1,497,249

Inventor
J. H. Sisson
By D. Swift
Attorney

Patented June 10, 1924.

1,497,249

UNITED STATES PATENT OFFICE.

JOHN H. SISSON, OF OAK GROVE, MISSOURI.

LAWN-MOWER RACK.

Application filed September 12, 1922. Serial No. 587,687.

*To all whom it may concern:*

Be it known that I, JOHN H. SISSON, a citizen of the United States, residing at Oak Grove, in the county of Jackson, State of Missouri, have invented a new and useful Lawn-Mower Rack; and I do hereby declare the following to be a full, clear, and exact description of the invention, such as will enable others skilled in the art to which it appertains to make and use the same.

The invention relates to lawn mower racks, and has for its object to provide a device of this character, on which a lawn mower may be supported in such a manner that its wheels and consequently the rotatable cutting elements may be rotated for sharpening the knives. The knives are rotated by rotation of one of the wheels, preferably through a belt connection through any suitable source of power.

A further object is to provide a lawn mower rack comprising a base, spaced hinged uprights for receiving the rear roller of the lawn mower, a frame having members for receiving the cross rod of the lawn mower, and a member for holding said cross rod against displacement. Also to provide means for holding the hinged frame in various positions according to the size of the lawn mower.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1:
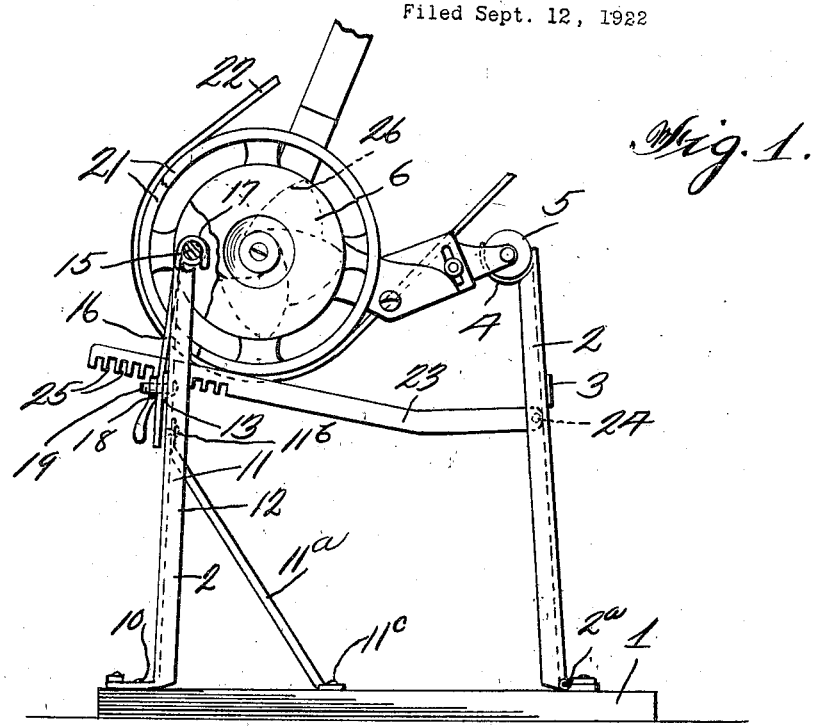
Figure 1 is a side elevation of the rack showing a conventional form of lawn mower supported thereon.

Referring to the drawing, the numeral 1 designates the base of the rack and 2 spaced vertically disposed members extending upwardly from the base and braced in relation to each other by bars 3 thereby forming a rigid frame. The members 2 are hingedly connected at 2ª to the base 1 and consequently the frame formed thereby may be moved, the purposes of which will presently appear. The upper ends of the vertically disposed members 2 are provided with U-shaped arms 4, which arms receive the roller 5 of the lawn mower 6, when said lawn mower is placed on the rack and support the roller end of the lawn mower. Connected at 10 to the base 1, and spaced from the members 2 is a rigid frame 11, which frame comprises upwardly extending members 12 and a cross connecting bar 13, which connects the members together and prevents outward spreading of the members 12. Frame 11 is braced by means of braces 11ª connected at 11ᵇ to the members 11 and at 11ᶜ to the base 1. The upper ends of the members 12 are provided with U-shaped arms 14, which receive the cross rod 15 of the lawn mower, and support said lawn mower in connection with the U-shaped members 4. After the rod 15 has been disposed in the U-shaped members 14, the holding arm 16 is moved downwardly until its hooked end 17 engages over the upper side of the rod 15 at which time the handle member 18 is rotated, which handle member is threaded on the bolt 19, which extends through slot 20 in the member 16, thereby tightening the same and rigidly holding the holding member 16 against upward movement. The arm 16 prevents upward movement of the rod 15, and consequently prevents upward displacement of the lawn mower, especially when one of its wheels 21 is being rotated by means of a belt 22, which may lead to any suitable source of power.

Figure 2:
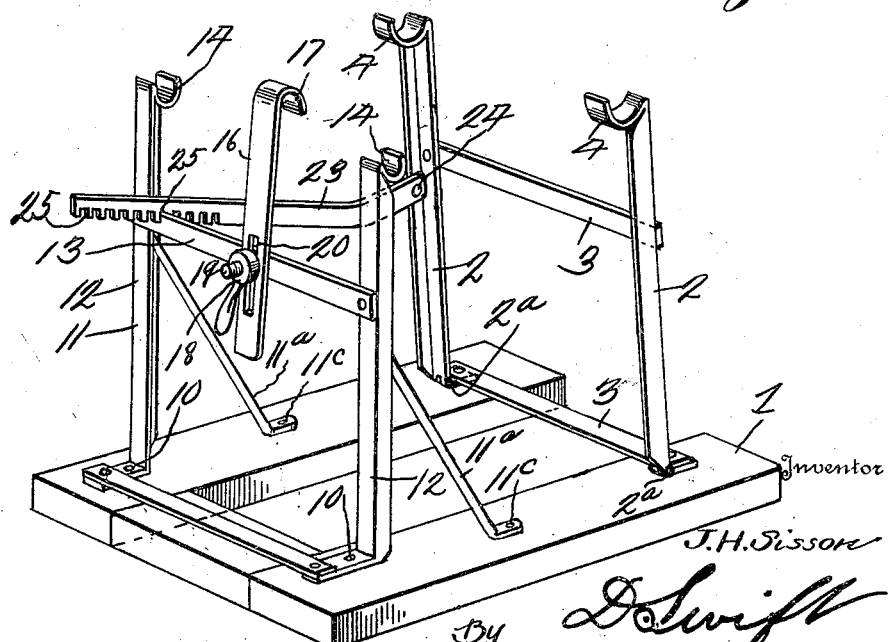
Figure 2 is a perspective view of the rack.

From the above it will be seen that a lawn mower rack is provided, which is simple in construction, positive in its operation, and one wherein different sizes of lawn mowers may be supported by moving the members 2 inwardly and outwardly, and holding the same in various adjusted positions, by means of the bar 23, which is pivoted at 24 to one of the members 2 and is provided with a plurality of notches, any one of which may receive the bar 13, as clearly shown in Figure 2. When it is desired to sharpen the knives 26 of the lawn mower, the wheels are rotated by means of the belt 22 thereby allowing the knives to be easily sharpened during the rotation thereof by applying a stone thereon. If so desired, other means may be provided for rotating the wheels of the lawn mower.

The invention having been set forth what is claimed as new and useful is:—

A lawn mower rack comprising a base, a vertically disposed rigid frame at one end of said base, horizontally disposed segmentally shaped members carried by the upper end of said base and adapted to receive the transversely disposed rod of a lawn mower, an adjustable hooked member carried by said frame and adapted to hook over said rod, a vertically disposed hinged frame carried by the other end of the base, U-shaped members carried by the upper end of the hinged frame and adapted to recive a transversely disposed roller of the lawn mower, a transversely disposed bar carried by the rigid frame, a bar pivoted to the hinged frame and extending over a transversely disposed bar of the rigid frame and provided with a plurality of notches for the reception of said transversely disposed bar of the rigid frame.

In testimony whereof I have signed my name to this specification in the presence of two subscribing witnesses.

JOHN H. SISSON.

Witnesses:
G. F. YOUREE,
L. H. SCHOONOVER.